United States Patent [19]
Goodgame

[11] 3,923,112
[45] Dec. 2, 1975

[54] DRIVEN WHEEL ARRANGEMENT

[76] Inventor: Muriel T. Goodgame, 305 W. Mesa, Hobbs, N. Mex. 88240

[22] Filed: Jan. 7, 1974

[21] Appl. No.: 431,547

[52] U.S. Cl. ............. 180/24.11; 180/74; 267/20 A; 280/104.5 R
[51] Int. Cl.² ...................... B60G 5/06; B60G 3/14
[58] Field of Search .... 180/22, 24.05, 24.08, 24.11, 180/24.12, 24.13; 280/104.5 A, 104.5 R; 267/20 R, 20 A

[56] References Cited
UNITED STATES PATENTS

| | | | |
|---|---|---|---|
| 1,482,726 | 2/1924 | Best | 180/9.54 |
| 1,975,794 | 10/1934 | Knox et al. | 180/24.05 |
| 2,091,509 | 8/1937 | Kramer | 267/20 A X |
| 2,098,894 | 11/1937 | Van Doorne | 180/24.05 |
| 2,299,006 | 10/1942 | Brown | 180/24.11 |
| 2,934,157 | 4/1960 | Harp | 180/24.08 X |
| 2,988,374 | 6/1961 | Boyles | 267/20 A X |
| 3,603,423 | 9/1971 | Schoonover | 180/74 |
| 3,792,871 | 2/1974 | Chalmers | 280/104.5 A |

FOREIGN PATENTS OR APPLICATIONS
381,894  8/1921  Germany ........................ 180/9.56

*Primary Examiner*—Leo Friaglia
*Attorney, Agent, or Firm*—Fishburn, Gold & Litman

[57] ABSTRACT

A wheel suspension and driving system for a vehicle includes a driving wheel rotatably mounted on each end of a generally horizontal driven axle and the driving wheel is rotated by power means on the vehicle. A support member at each end of the axle is rotatably supported on the axle and each support member has a hub thereon to rotatably mount a respective driven wheel having a tread portion thereof in engagement with a ground surface and with a tread portion of the respective driving wheel. Load support members for each driven wheel each extend between and have respective opposite ends thereof mounted on the respective support member and a frame of the vehicle to cushion movement of the respective support members and driven wheels relative to the axle and to resiliently urge the driven wheels into ground contact.

17 Claims, 7 Drawing Figures

DRIVEN WHEEL ARRANGEMENT

The present invention relates to a wheel suspension and driving system particularly adapted for recreation and cross country type vehicles and more particularly to a wheel suspension and driving system having a driving wheel rotatably mounted on each end of an axle and each in engagement with a respective rotatably supported driven wheel in engagement with a ground surface.

The principle objects of the present invention are: To provide a wheel suspension and driving system for recreation and cross country type vehicles which provides a smooth and stable ride; to provide such a wheel suspension system having load support members coplanar with surface engaging wheels, to provide such a load support system which is compact in lateral dimensions and has coaxial springs positioned above a driving wheel and a driven wheel thereby permitting a support member protecting and supporting same to also have a narrow lateral dimension; to provide such a wheel suspension and driving system wherein the height of a flange on the support member controls or limits the up and down movement of the respective driven wheel; to provide such a wheel suspension and driving system which is particularly adapted for recreational and cross country type vehicles; to provide such a wheel suspension and driving system having tandem wheels each driven by the same driving wheel; to provide such a wheel suspension and driving system wherein the tandem wheels may be assembled as a unit and in a manner whereby equal weight or load is carried by each wheel of the tandem; and to provide such a wheel suspension and driving system which is economical to manufacture, durable in construction, positive in operation, and particularly well adpated for the proposed use.

Other objects and advantages of this invention will become apparent from the following description taken in connection with the accompanying drawings wherein are set forth, by way of illustration and Example, certain embodiments of this invention.

The drawings constitute a part of this specification and include exemplary embodiments of the present invention and illustrate various objects and features of the wheel suspension and driving system.

Figure 1:
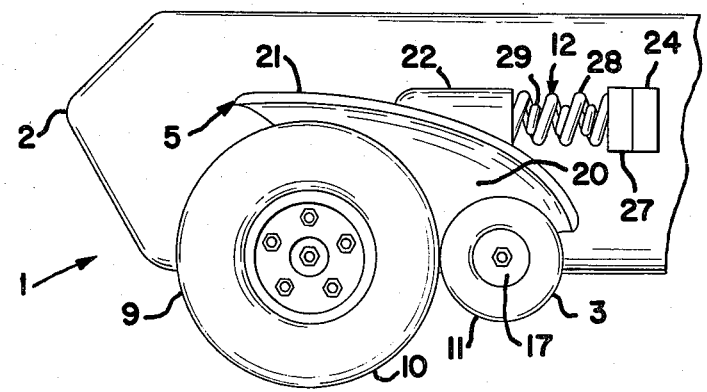
FIG. 1 is a fragmentary side elevational view of a vehicle having a wheel suspension and driving system embodying features of the present invention.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a wheel suspension and driving system for a vehicle 2 and includes a driving member, such as a driving wheel 3, rotatably mounted on each end of a generally horizontal axle 4 and the driving wheel 3 is driven by suitable power means not shown on the vehicle 2. A support member 5 has one end 6 thereof rotatably supported on a respective end of the axle 4 and the support member 5 has a hub 7 on the other end 8 thereof to rotatably mount a driven vehicle supporting wheel 9 having a tread portion 10 thereof in engagement with a ground surface and a tread portion 11 of the driving wheel 3. Load support members 12 extend between and have respective opposite ends thereof mounted on the support member 5 and on a frame 14 of the vehicle 2 to resiliently urge the vehicle supporting wheels 9 into ground contact.

The axle 4 may be any suitable member for rotatably supporting a driving member, such as the driving wheel 3 at each end thereof and in the illustrated structure, the axle 4 is a tubular member adapted to have a drive shaft 15 extending therethrough. The illustrated tubular member has an enlarged portion 16 adjacent each outer or free end thereof, for purpose later described.

A hub 17 is illustrated as a wheel or rim suitably secured to each outer or free end of the drive shaft 15, as by being bolted thereto. Each hub 17 has a body portion sleeved on the axle 4 with suitable bearings therebetween and each wheel or rim is thereby adapted to have a respective driving wheel 3 mounted thereon whereby rotation of the drive shaft 15 effects rotation of each driving wheel 3. Each driving wheel 3 is illustrated as a pneumatic or inflatable tire having the tread portion 11 on the periphery thereof with the tread portion 11 having a pattern adapted to effect suitable traction with the respective driven wheel 9.

A bearing housing 18 is rotatably mounted on each outer or free end of the axle 4 and positioned between the respective hub 17 and the enlarged portion 16. In the illustrated structure, the bearing housing 18 is sleeved on the axle 4 and suitable bearings therebetween are adapted to rotatably support the bearing housng 18 with one end thereof in engagement with the enlarged portion 16 of the axle 4.

Each support member 5 is mounted for rotation about the driven axle 4 and includes a web 20 having the one end 6 thereof suitably secured to the bearing housing 18, as by welding, with the web 20 extending therefrom and substantially normal to the drive shaft 15. In the illustrated structure, the hub 7 is mounted on the other end 8 of the web 20 and has an axis spaced from and substantially parallel with the axis of the axle 4 and drive shaft 15 whereby each hub 7 is movable in an arc about the axle 4.

Each support member 5 includes a flange 21 extending from the web 20 thereof and positioned above the respective driving wheel 3 and above the driven wheel 9 mounted on the hub 7. The flange 21 has a mount or base 22 thereon which is adapted to receive and support one end of the load supporting members 12, as later described.

The hub 7 is illustrated as a generally cylindrical axle portion extending from the other end 8 of the web 20 and a suitable bearing housing 23 is mounted thereon which is adpated to have the driven wheel 9 mounted thereon and thereby rotatable about the hub 7. The illustrated driven wheel 9 is a pneumatic or inflatable tire having the tread portion 10 thereof in engagement with the tread portion 11 of the driving wheel 3 whereby rotation of each driving wheel 3 effects rotation of the respective driven wheel 9 and thereby movement of the vehicle 2 along a suitable supporting surface, such as pavement or ground.

Each side of the frame 14 has a frame abutment 24 having one end 25 thereof suitably secured to the vehicle frame 14, as by being mounted on the horizontal axle 4, and an other end 26 positioned in facing relation with the mount or base 22 on the flange 21 of the support member 5. The other end 26 of each frame abutment 24 has a mount or base 27 thereon which is adapted to receive the other end of the respective load supporting members 12.

The load support members 12 are adpated to resist movement of the respective driven wheel toward the frame abutment member 24 and to cushion movement toward and away from said frame abutment member 24. In the illustrated structure, each of the load support members 12 include a first compression spring 28 having one end secured in the mount or base 22 on the flange 21 of the support member 5 and the other end thereof secured in the mount or base 27 on the frame abutment 24. A second compression spring 29 also has one end secured in the mount or base 22 on the flange 21 of the support member 5 and the other end thereof secured in the mount or base 27 on the frame abutment 24.

The second spring 29 is sleeved within and is coaxial with the first spring 28 and has a different resistance to compression thereof than the first compression spring 28 whereby the second compression spring 29 is adapted to absorb vibrations and resist excessive movement of the first compression spring 28. The load support members 12 are each adapted to resiliently urge the vehicle supporting wheel 9 into ground contact.

Figure 2:
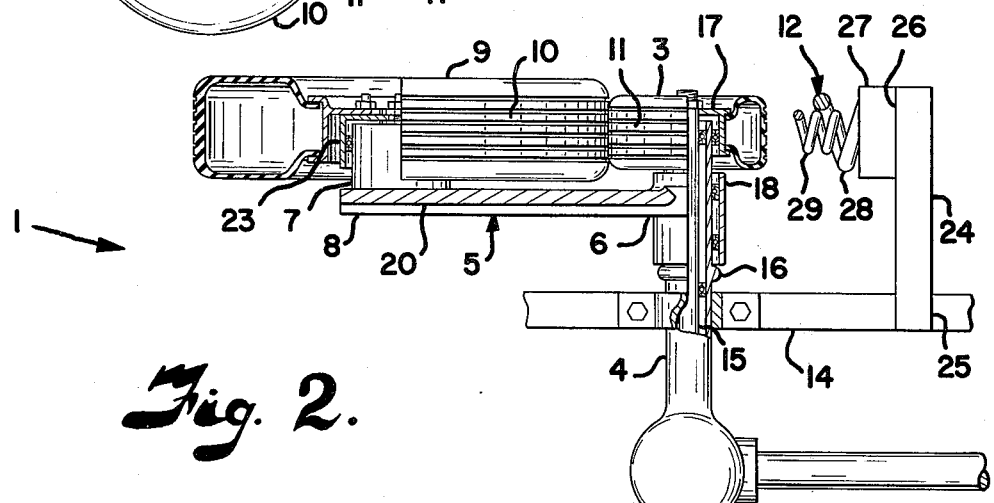
FIG. 2 is a fragmentary plan view of the vehicle with portions thereof broken away to better illustrate the component parts of the wheel suspension and driving system.
Figure 3:
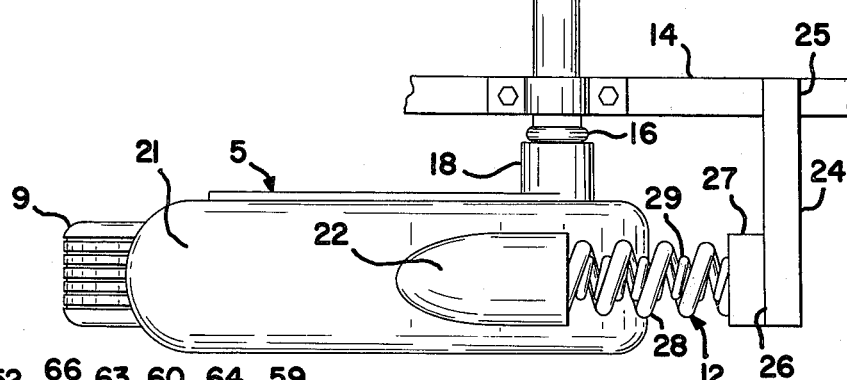
FIG. 3 is a fragmentary side elevational view of a modified wheel suspension and driving system having tandem driven wheels.
Figure 3:
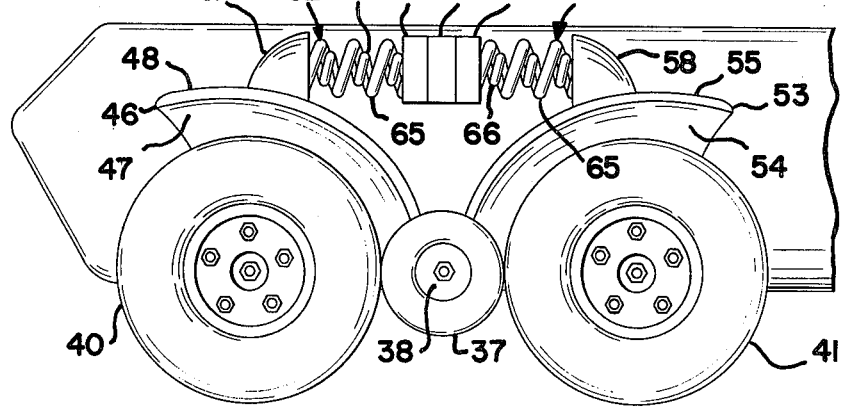
Figure 4:
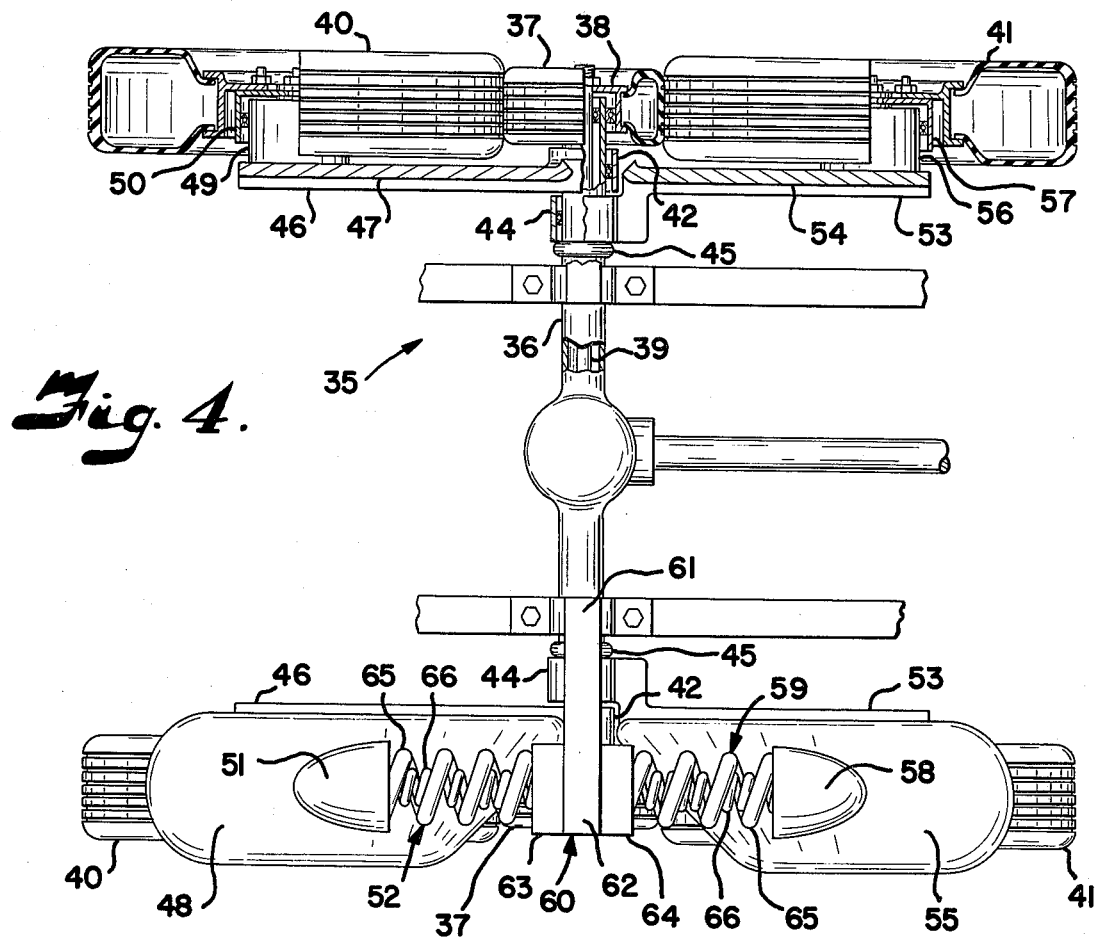
FIG. 4 is a fragmentary plan view of the modified wheel suspension and driving system with portions broken away to better illustrate the component parts of the modified system.

FIGS. 3 and 4 illustrate a modified wheel suspension and driving system 35 which includes an axle 36 and each end of the axle 36 has a driving member, such as a driving wheel 37 mounted on a respective wheel or hub 38 secured on the respective end of a drive shaft 39 all of which are similar to the corresponding components illustrated in FIGS. 1 and 2.

The modified wheel suspension and driving system 35 for each side of the vehicle includes tandem driven vehicle supporting wheels 40 and 41 each driven by the respective driving wheel 37. In the illustrated embodiment a first bearing housing 42 is rotatably mounted on each end of the axle 36. A second bearing housing 44 is also rotatably mounted on each end of the axle 36 and positioned between the respective bearing housing 42 and a respective enlarged portion 45 formed adjacent each end of the axle 36.

The illustrated modified wheel suspension and driving system 35 for each side of the vehicle includes a first support member 46 having a web 47 with one end thereof secured to the first bearing housing 42 and extending therefrom and substantially normal to the longitudinal axis of the axle 36 and drive shaft 39 and the first support member 46 has a flange 48 extending from the web 47 and above the driven wheel 40. The web 47 of the first support member 46 has a hub 49 adjacent the other end there and the hub 49 has a bearing housing 50 thereon for rotatably supporting the driven wheel 40. The flange 48 of the first support member 46 has a mount or base 51 thereon which is adapted to receive one end of first load support members 52.

Each side of the vehicle has a second support member 53 having a web 54 with one end thereof secured to the second bearing housing 44 and extending therefrom and the second support member 53 is substantially normal to the longitudinal axis of the axle 36 and drive shaft 39. The second support member 53 includes a flange 55 extending from the web 54 and above the driven wheel 41. A hub 56 is mounted on the web 54 adjacent the other end of the web 54 and the hub 56 has a bearing housing 57 thereon which is adapted to rotatably support the driven wheel 41. The flange 55 of the second support member 53 has a mount or base 58 thereon which is adapted to receive one end of second load support members 59.

The driven wheels 40 and 41 on each side of the vehicle are each substantially similar to the driven wheel 9 and are each preferably pneumatic or inflatable tires each having a respective tread portion thereof in engagement with the tread portion of the respective driving wheel 37.

A frame abutment 60 for each side of the vehicle has one end 61 thereof suitably secured to the axle 36 adjacent a respective end thereof and an other end 62 of the frame abutment 60 is positioned between and has respective opposite sides thereof in facing relation with the mount or base 51 on the flange 48 of the first support member 46 and the mount or base 58 on the flange 55 of the second support member 53. The other end 62 of each frame abutment 60 has first and second mounts or bases 63 and 64 respectively formed in the respective opposite sides thereof. The first mount or base 63 is adapted to receive the other end of the first load support members 52 and the second mount or base 64 is adapted to receive the other end of the second load support members 59.

The illustrated first and second load support members 52 and 59 are each similar to the load support members 12 and each includes first and second compression springs 65 and 66 respectively.

The embodiment illustrated in FIGS. 3 and 4 permits independent movement of each of the driven wheels 40 and 41 during movement of the vehicle over obstructions and the load support members 52 and 59 cushion movement of the respective driven wheel 40 and 41.

Figure 5:
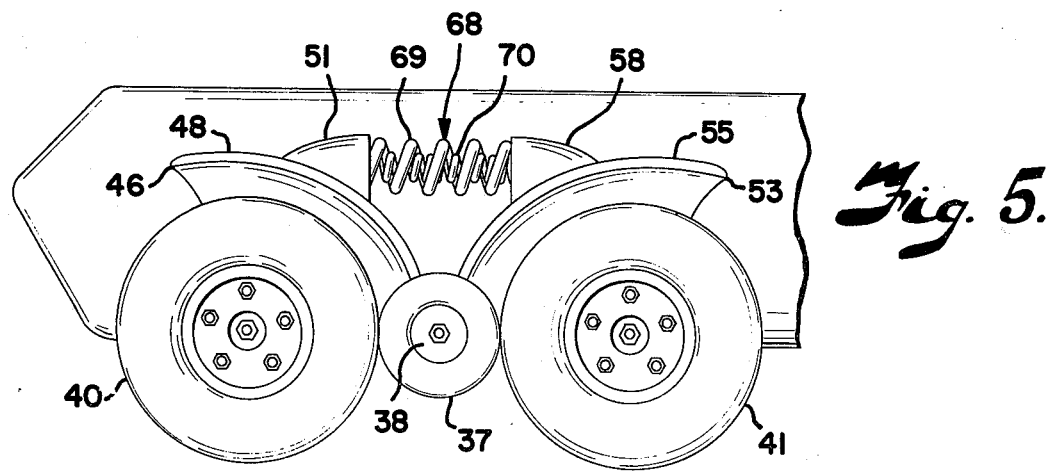
FIG. 5 is a fragmentary side elevational view of an other modified wheel suspension and driving system having tandem wheels and single set of coaxial load supporting members.

FIG. 5 illustrates an other embodiment or a modified wheel suspension and driving system similar to the modified wheel suspension and driving system 35 except the frame abutment 60 has been omitted and there is a single set of load support members 68 formed of a first compression spring 69 and a second compression spring 70 each having one end thereof received in the mount or base 51 on the flange 48 of the first support member 46 and the springs 69 and 70 each have the other end thereof received in the mount or base 58 on the flange 55 of the second support member 53.

The driven wheels 40 and 41 in the structure illustrated in FIG. 5 are each adapted to support an equal load, for example, one-half of the load applied to the respective end of the axle 36 and the driven wheels 40 and 41 are adapted to move in an arc about the axle 36 while the load support members 68 maintain the respective portion of the load thereon while the driven wheels 40 and 41 are moving relative to the axle 36 with said movement being resisted by the load support members 68 which resiliently urge the driven wheels 40 and 41 apart and into vehicle supporting ground contact.

Figure 6:
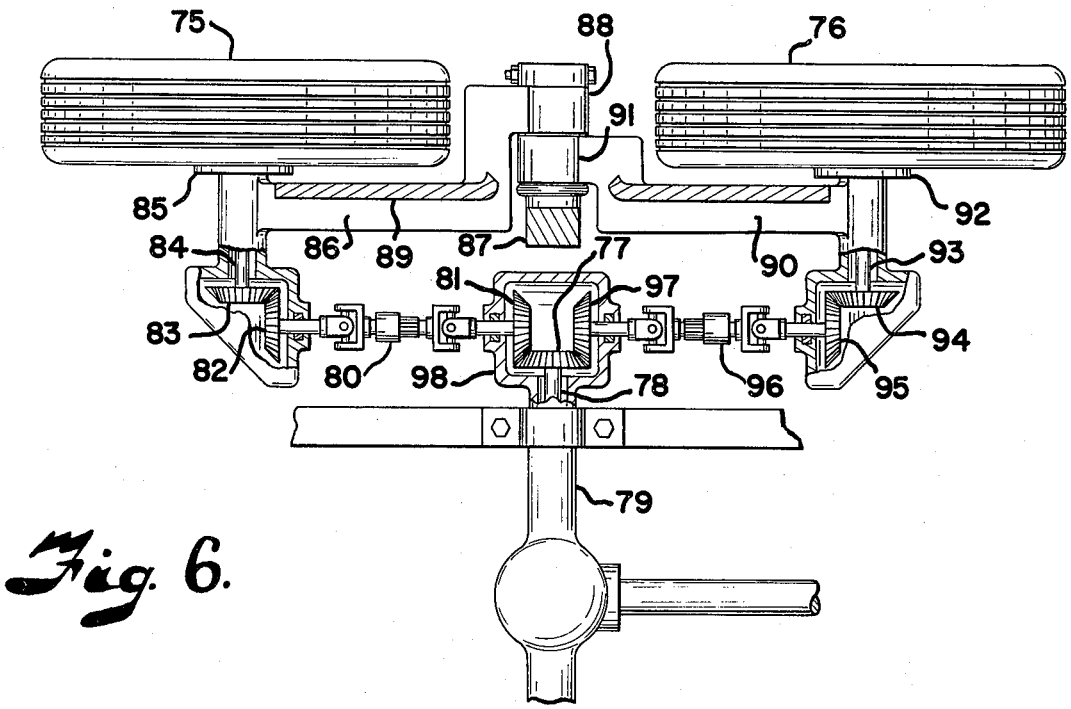
FIG. 6 is a fragmentary plan view of a modified power transmitting means for driving a vehicle supporting wheel.

FIG. 6 illustrates a modified power transmitting means for driving vehicle supporting wheels 75 and 76. The structure illustrated in FIG. 6 includes a driving member, such as a miter or bevel gear 77 mounted on each of a drive shaft 78 rotatably supported within a suitable axle 79.

The driving member 77 has means operatively engaging same for transmitting power from the drive shaft 78 to the vehicle supporting wheels 75 and 76. In the illustrated structure, the means for transmitting power to the vehicle supporting wheel 75 includes a first rotatably mounted power transmitting shaft 80 extending substantially normal to the drive shaft 78 and having bevel gears 81 and 82 on respective opposite ends thereof. One of the bevel gears, for example bevel gears 81, meshes with the bevel gear 77 on the drive shaft 78 whereby rotation of the drive shaft 78 effects rotation of the first shaft 80. The bevel gear 82 on the end of the first shaft 80 spaced from the driving member 77 engages and meshes with a similar bevel gear 83 on the end of a power receiving shaft 84.

The power transmitting shaft 80 is illustrated as being formed of short drive shafts which telescope and have respective opposite ends thereof connected to shafts having the gears 81 and 82 respectively mounted thereon, as by suitable universal joints. The gears 77 and 81 are sealed in a housing and the gears 82 and 83 are sealed in a housing mounted on the support member 86 having the power receiving shaft 84 therein.

The power receiving shaft 84 is substantially parallel with the drive shaft 78 and is connected to and extends from a hub 85 which is mounted on one end of a support member 86. The hub 85 has the vehicle supporting wheel 75 rotatably mounted on one end thereof.

The support member 86 may be supported in any suitable manner on the respective vehicle. In the illustrated structure, the frame (not shown) of the vehicle has a mounting member 87 depending from the frame (not shown) of the respective vehicle. The mounting member 87 has an outwardly extending portion which is substantially coaxial with the drive shaft 78 and has a suitable bearing housing 88 mounted thereon.

The support member 86 has one end thereof suitably secured to the bearing housing 88, as by welding, with the hub 85 being mounted on the other end thereof whereby the hub 85 is movable in an arc about the outwardly extending portion of the mounting member 87. The support member 86 is thereby mounted for rotation substantially about the axis of the drive shaft 78. The support member 86 includes a web portion 89 similar to the web portion 20 and for the same purpose. The shaft 84 is rotatably mounted in a suitable housing which is secured to the support member 86, as by welding, and is movable therewith.

The driving or power transmitting means illustrated in FIG. 6 is adapted for use with a single vehicle supporting wheel, such as vehicle supporting wheel 75, or with tandem vehicle supporting wheels, such as vehicle supporting wheels 75 and 76. When a second vehicle supporting wheel 76 is used, a second support member 90 has one end mounted on and secured to a suitable bearing housing 91, as by welding, and the bearing housing 91 is rotatably mounted on the outwardly extending portion of the mounting member 87. The other end of the second support member 90 has a hub 92 mounted thereon with a power receiving shaft 93 extending therefrom. The shaft 93 is substantially parallel with the drive shaft 78 and with the power receiving shaft 84 and has a bevel gear 94 on the end thereof which meshes with a bevel gear 95 on one end of a power transmitting shaft 96 similar to the power transmitting shaft 80. The shaft 96 has a bevel gear 97 on the other end thereof which meshes with the bevel gear or driving member 77.

The shaft 84 and 93 are each rotatably mounted in suitable respective housings supported on the support members 86 and 90 respectively. The gears 77, 81 and 97 are mounted within a suitable housing 98 having sealed slots therein for movement of the shafts 80 and 96 in respective arcs each having the center thereof on the longitudinal axis of the drive shaft 78. The support members 86 and 90 have means thereon for mounting suitable load support members in a manner similar to the structures illustrated in FIGS. 1 to 5 inclusive.

Figure 7:
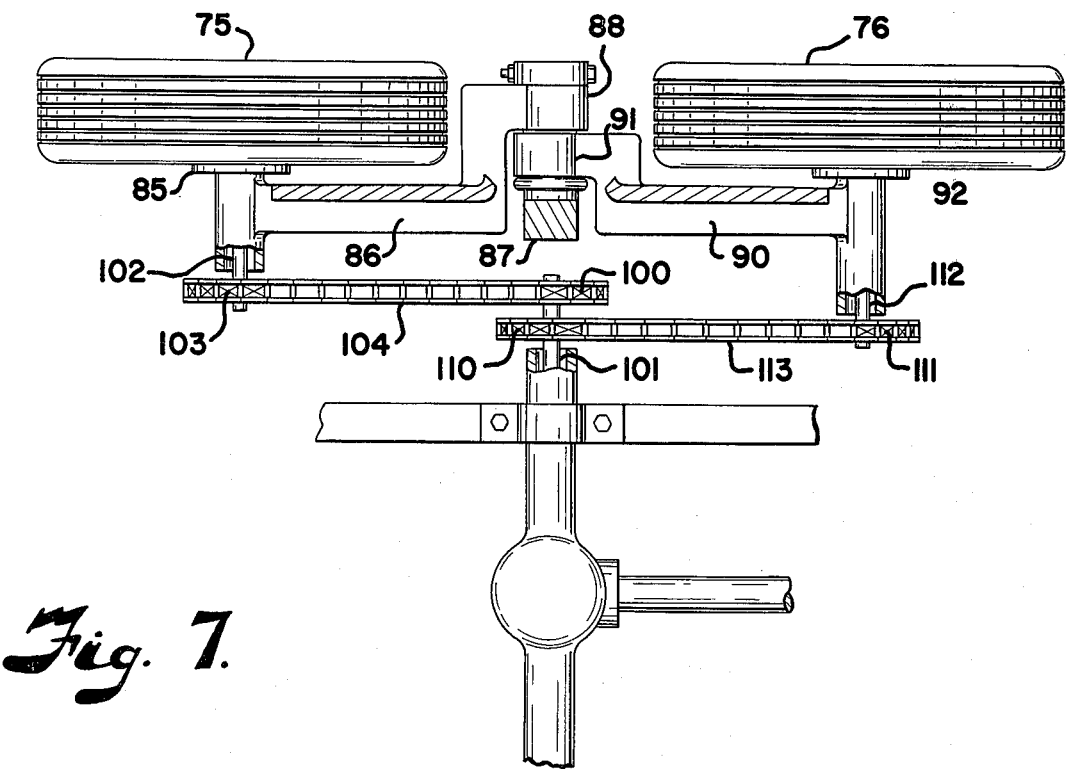
FIG. 7 is a fragmentary plan view of an other modified power transmitting means for driving a vehicle supporting wheel.

FIG. 7 illustrates an other modified power transmitting means for driving the vehicle supporting wheels 75 and 76 which are mounted on the hubs 85 and 92 respectively. The hubs 85 and 92 are mounted on outer ends of the support members 86 and 90 respectively and the support members 86 and 90 have the other ends thereof suitably secured to bearing housings 88 and 91 respectively, as by welding, whereby the structure illustrated in FIG. 7 is substantially similar to the structure illustrated in FIG. 6 except that the driving member is illustrated as a first sprocket 100 mounted on a drive shaft 101 and rotatable therewith.

The means for transmitting power from the driving member or the first sprocket 100 to the vehicle supporting wheel 75 includes a power receiving shaft 102 connected to and extending from the hub 85 and coaxial therewith. The shaft 102 is substantially parallel with the drive shaft 101. A second sprocket 103 is mounted on the shaft 102 and is aligned with the first sprocket 100 on the drive shaft 101. An endless chain 104 extends between and is operatively engaged with the second sprocket 103 on the shaft 102 and the first sprocket 100 on the drive shaft 101.

The power transmitting means illustrated in FIG. 7 may be used with a single vehicle supporting wheel or with tandem vehicle supporting wheels. When tandem wheels are used, a second driving sprocket 110 is mounted on the drive shaft 101 and spaced from the first driving sprocket 100. The second driving sprocket 110 is aligned with a power receiving sprocket 111 mounted on a shaft 112 connected to and extending from the hub 92 and substantially coaxial therewith. An endless chain 113 extends between and is in operative engagement with the second driving sprocket 110 and with the power receiving sprocket 111 whereby rotation of the drive shaft 101 effects rotation of the vehicle supporting wheels 75 and 76.

It is to be understood that while I have illustrated and described certain forms of my invention it is not to be limited to these specific forms or arrangement of parts herein described and shown.

What I claim and desire to secure by Letters Patent is:

1. A wheel suspension and driving system for a non-endless track type vehicle and comprising:
   a. a generally horizontal driven axle mounted on a vehicle and supported by a frame thereof;
   b. a driving member mounted on said driven axle and rotatable therewith;
   c. a support member mounted for rotation substantially about the axis of said driven axle and having a hub spaced from said axis, said hub having an axis substantially parallel with said driven axis;
   d. a vehicle supporting wheel rotatably mounted on said hub;
   e. means operatively engaging said driving member for transmitting power from same to said vehicle supporting wheel to effect rotation thereof; and
   f. resilient load support means engaging said support member, said resilient load support means being located above said support member and substantially coplanar with said vehicle supporting wheel, said load support means being in compression on a generally horizontal axis and resiliently urging said vehicle supporting wheel into ground contact.

2. A wheel suspension and driving system as set forth in claim 1 including:
   a. a second support member mounted for independent rotation substantially about the axis of said driven axle and having a hub spaced from said axis, said hub on said second support member having an axis substantially parallel with the axis of said driven axle;
   b. a second vehicle supporting wheel rotatably mounted on said hub on said second support member; and
   c. second resilient load support means engaging said second support member, said second resilient load support means being above said second support member and substantially coplanar with said second vehicle supporting wheel, said second resilient load support means being substantially coaxial with said first named load support means, said second load support means resiliently urging said second vehicle supporting wheel into ground contact.

3. A wheel suspension and driving system as set forth in claim 2 wherein:
   a. said first named support member and said second support member each have a respective web extending from the axis of said driven axle and substantially normal thereto;
   b. said first named support member and said second support member each have a flange extending from said respective web thereof and positioned above said respective vehicle supporting wheel; and
   c. said first named load support means and second load support means each have a respective one end thereof mounted on said flange of said first named support member and on said second support member respectively.

4. A wheel suspension and driving system as set forth in claim 1 wherein:
   a. said driving member is a bevel gear mounted on said driven axle;
   b. said means for transmitting power from said driving member to said vehicle supporting wheel includes:
      1. a rotatably mounted shaft extending substantially normal to said driven axle and having a pair of spaced bevel gears mounted thereon and each positioned on a respective opposite end of said shaft, one of said bevel gears meshing with said bevel gear mounted on said driven axle; and
      2. a second shaft connected to and extending from said hub and coaxial therewith, said second shaft having a bevel gear meshing with the bevel gear on the other end of said first named shaft; and
   c. said load support means includes:
      1. a first compression spring having one end thereof mounted on said support member and the other end mounted on the frame of the vehicle; and
      2. a second compression spring coaxial with said first compression spring and having one end thereof mounted on said support member and the other end mounted on the frame of the vehicle, said second compression spring having a different resistance to compression thereof than said first compression spring.

5. A wheel suspension and driving system as set forth in claim 1 wherein:
   a. said driving member is a sprocket mounted on said driven axle; and
   b. said means for transmitting power from said driving member to said vehicle supporting wheel includes:
      1. a shaft connected to and extending from said hub and coaxial therewith, said shaft having a sprocket mounted thereon and aligned with said sprocket on said driven axle; and
      2. an endless chain extending between and operatively engaging said sprocket on said driven axle and said sprocket on said shaft extending from said hub.

6. A wheel suspension and driving system as set forth in claim 1 wherein:
   a. said driving member is an inflatable wheel having a peripheral tread portion; and
   b. said vehicle supporting wheel has a peripheral tread portion and is inflatable to move the tread portion thereof into engagement with the tread portion of said driving member whereby rotation of said driving member effects rotation of said vehicle supporting wheel.

7. A wheel suspension and driving system for a vehicle and comprising:
   a. a generally horizontal driven axle mounted on a vehicle and supported by a frame thereof;
   b. a driving wheel mounted on said driven axle and coaxial therewith, said driving wheel having a tread portion of the periphery thereof;
   c. means on the vehicle and operatively connected to said driven axle for effecting rotation of said driving wheel;
   d. a support member rotatably mounted on said driven axle and having a hub extending therefrom and spaced from said driven axle, said hub having an axis substantially parallel with said driven axle;
   e. means on said hub for rotatably mounting a driven wheel having a tread portion in engagement with said tread portion of said driving wheel whereby rotation of said driving wheel effects rotation of said driven wheel; and f. resilient load support means extending between and having one end thereof mounted on said support member and the other end thereof fixed relative to said frame, said load support means resiliently urging said driven wheel into ground contact, said resilient load support means being located above said support member and substantially coplanar with said driven wheel, said load support means being in compression on a generally horizontal axis.

8. A wheel suspension and driving system as set forth in claim 7 wherein:
   a. said driven axle has a hub portion thereon;
   b. said driving wheel is mounted on the hub portion of said driven axle and is inflatable; and
   c. said driven wheel is inflatable to move the tread portion thereof into engagement with the tread portion of said driving wheel whereby rotation of said driving wheel effects rotation of said driven wheel.

9. A wheel suspension and driving system as set forth in claim 7 wherein:
   a. said driving wheel and said driven wheel are substantially coplanar and in longitudinal alignment; and
   b. said resilient load support means is positioned above and substantially coplanar with both said driving wheel and said driven wheel.

10. A wheel suspension and driving system as set forth in claim 7 wherein:
    a. said driving wheel and said driven wheel are substantially coplanar and in longitudinal alignment;
    b. said support member has a web extending from said driven axle and substantially normal thereto;
    c. said support member has a flange extending from said web thereof and positioned above said driving wheel and said driven wheel; and
    d. said resilient load support means has one end mounted on said flange of said support member and is positioned above and substantially coplanar with both said driving wheel and said driven wheel.

11. A wheel suspension and driving system as set forth in claim 10 wherein said resilient load support means includes:
    a. a first compression spring having one end thereof mounted on said flange of said support member and the other end mounted on said frame; and
    b. a second compression spring coaxial with said first compression spring and having one end thereof mounted on said flange of said support member and the other end mounted on said frame, said second compression spring having a different resistance to compression thereof than said first compression spring.

12. A wheel suspension and driving system as set forth in claim 7 including:
    a. a second support member rotatably mounted on said driven axle and having a hub extending therefrom and spaced from said driven axle, said hub on said second support member having an axis substantially parallel with said driven axle and with the axis of said hub on said first named support member;
    b. a driven wheel rotatably mounted on said hub on said second support member and having a tread portion thereof in engagement with said tread portion of said driving wheel whereby rotation of said driving wheel effects rotation of said driven wheel on said hub of said first named support member and said driven wheel on said hub of said second support member; and
    c. second resilient load support means extending between and having one end thereof mounted on said second support member and the other end thereof fixed relative to said frame said second resilient load support means resiliently urging said driven wheel on said hub of said second support member into ground contact.

13. A wheel suspension and driving system as set forth in claim 12 wherein:
    a. said driving wheel and said driven wheel on said hub of said first named support member and said driven wheel on said hub of said second support member are coplanar and in longitudinal alignment; and
    b. said first named resilient load support means and said second resilient load support means are positioned above and substantially coplanar with each of said driving wheel and said driven wheel on said hub of said first named support member and said driven wheel on said hub of said second support member.

14. A wheel suspension and driving system as set forth in claim 12 wherein:
    a. said driving wheel and said driven wheel on said hub of said first named support member and said driven wheel on said hub of said second support member are coplanar and in longitudinal alignment;
    b. said first named support member and said second support member each have a respective web extending from said driven axle and substantially normal thereto;
    c. said first named support member and said second support member each have a flange extending from said respective web thereof and positioned above said respective driven wheel; and
    d. said first named resilient load support means and said second resilient load support means each have one end thereof mounted on said flange of said respective support member and positioned above and substantially coplanar with said driving wheel and each of said respective driven wheels.

15. A wheel suspension and driving system as set forth in claim 14 wherein said first named resilient load support means and said second resilient load support means each include:
    a. a first compression spring having one end thereof mounted on said flange of said respective support member and the other end mounted on said frame; and
    b. a second compression spring coaxial with said first compression spring and having one end thereof mounted on said flange of said respective support member and the other end mounted on said frame, said second compression springs each having a different resistance to compression thereof than said respective first compression springs.

16. A wheel suspension and driving system as set forth in claim 1 including:
    a. a second support member mounted for independent rotation substantially about the axis of said driven axle and having a hub spaced from said axis, said hub on said second support member having an axis substantially parallel with the axis of said driven axle;

b. a second vehicle supporting wheel rotatably mounted on said hub on said second support member and positioned substantially coplanar with said first named vehicle supporting wheel; and c. means on said second support member positioned to be engaged by said resilient load support means whereby same extends between said first named and said second support members and is coplanar with said first named and said second vehicle supporting wheels.

17. A wheel suspension and driving system as set forth in claim 3 wherein said first named load support means and said second load support means each include:

a. a first compression spring having one end thereof mounted on said flange of said respective support member and the other end mounted on the frame of the vehicle; and b. a second compression spring coaxial with said first compression spring and having one end thereof mounted on said flange of said respective support member and the other end mounted on the frame of the vehicle, said second compression springs each having a different resistance to compression thereof than said respective first compression springs.

* * * * *